United States Patent
Chen et al.

(10) Patent No.: US 12,353,621 B2
(45) Date of Patent: Jul. 8, 2025

(54) NEAR-EYE DISPLAY DEVICE, EYE COMMAND RECOGNITION METHOD AND READABLE STORAGE MEDIUM

(71) Applicant: GOERTEK INC., Weifang (CN)

(72) Inventors: Yanwei Chen, Weifang (CN); Pingping Wang, Weifang (CN); Jinjie Zhang, Weifang (CN)

(73) Assignee: GOERTEK INC., Weifang (CN)

( * ) Notice: Subject to any disclaimer, the term of this patent is extended or adjusted under 35 U.S.C. 154(b) by 0 days.

(21) Appl. No.: 18/433,860

(22) Filed: Feb. 6, 2024

(65) Prior Publication Data

US 2024/0176416 A1    May 30, 2024

Related U.S. Application Data

(63) Continuation of application No. PCT/CN2021/138742, filed on Dec. 16, 2021.

(30) Foreign Application Priority Data

Sep. 10, 2021   (CN) .......................... 202111065937.3

(51) Int. Cl.
    *G06F 3/01*        (2006.01)
(52) U.S. Cl.
    CPC .................................. *G06F 3/013* (2013.01)
(58) Field of Classification Search
    CPC ...................................................... G06F 3/013
    See application file for complete search history.

(56) References Cited

U.S. PATENT DOCUMENTS

| | | | |
|---|---|---|---|
| 9,285,872 B1* | 3/2016 | Raffle ..................... | G06F 3/012 |
| 10,201,297 B1* | 2/2019 | Biederman ............ | A61B 5/746 |
| 10,962,789 B1* | 3/2021 | Lewis ..................... | A61B 3/113 |

(Continued)

FOREIGN PATENT DOCUMENTS

| CN | 102402837 A | 4/2012 |
|---|---|---|
| CN | 105006105 A | 10/2015 |

(Continued)

OTHER PUBLICATIONS

First Office Action issued in Chinese Application No. 202111065937.3; mailed Mar. 7, 2024; 25 pgs.

(Continued)

*Primary Examiner* — Afroza Chowdhury
(74) *Attorney, Agent, or Firm* — HAUPTMAN HAM, LLP

(57) ABSTRACT

Disclosed are a near-eye display device, an eye command recognition method and a readable storage medium. The near-eye display device includes: an eyeglass frame, a lens and a transparent electrode layer; the lens is provided on the eyeglass frame, the transparent electrode layer is provided on a surface of the lens, and the transparent electrode layer is configured to detect capacitance changes at the position of the human eye. The eye command recognition method includes: controlling the transparent electrode layer of the near-eye display device to obtain capacitance information at the position of the human eye; determining motion of the human eye based on the capacitance information; and converting the determined motion of the human eye into control commands for controlling the near-eye display device.

12 Claims, 18 Drawing Sheets

(56) References Cited

U.S. PATENT DOCUMENTS

| | | | | |
|---|---|---|---|---|
| 2015/0126281 A1* | 5/2015 | Lewis | ................... | A63F 13/213 |
| | | | | 351/158 |
| 2016/0353988 A1* | 12/2016 | Moller | ................... | A61B 3/113 |
| 2017/0112433 A1* | 4/2017 | Pugh | ..................... | A61B 5/4812 |
| 2017/0115736 A1* | 4/2017 | Patel | ....................... | G06F 3/013 |
| 2017/0227792 A1* | 8/2017 | Starner | ................. | A61B 3/113 |

FOREIGN PATENT DOCUMENTS

| | | |
|---|---|---|
| CN | 105260017 A | 1/2016 |
| CN | 105579892 A | 5/2016 |
| CN | 107743605 A | 2/2018 |
| CN | 109116991 A | 1/2019 |
| JP | 2015205114 A | 11/2015 |
| KR | 10-2016-0031756 A | 3/2016 |

OTHER PUBLICATIONS

International Search Report and Written Opinion issued International Application No. PCT/CN2021/138742; mailed May 24, 2022; 14 pgs.

* cited by examiner

NEAR-EYE DISPLAY DEVICE, EYE COMMAND RECOGNITION METHOD AND READABLE STORAGE MEDIUM

CROSS-REFERENCE TO RELATED APPLICATIONS

The present application is a continuation application of International Application No. PCT/CN2021/138742, filed on Dec. 16, 2021, which claims priority to Chinese Patent Application No. 202111065937.3, filed on Sep. 10, 2021. The disclosures of the above-mentioned applications are incorporated herein by reference in their entireties.

TECHNICAL FIELD

The present application relates to the technical field of wearable products, and in particular to a near-eye display device, an eye command recognition method and a readable storage medium.

BACKGROUND

In wearable products, a user usually controls the product through gestures. However, when the user uses a near-eye display device, his hands will perform other actions, such as taking a water cup or operating a keyboard. When the hands are involved in other work, using both hands to control the product will inevitably require the user to pause the work in their hands, thus causing the work process of the hands to be interrupted. The hands will switch back and forth between the original work process and the control of the product. Switching between the two different work processes will seriously reduce the efficiency of user's use of the near-eye display device.

SUMMARY

Based on this, in view of the problem that the near-eye display device is currently controlled by both hands, resulting in the work process of the hands being interrupted, the hands switching between two different working processes, and the user's efficiency in using the near-eye display device being reduced, it is necessary to provide a near-eye display device, an eye command recognition method and a readable storage medium, aiming to reduce the involvement of hands in controlling the product and improve the user's efficiency in using the near-eye display device.

In order to achieve the above purpose, the present application proposes a near-eye display device, which includes:
an eyeglass frame;
a lens provided on the eyeglass frame; and
a transparent electrode layer provided on the lens.

The transparent electrode layer is configured to detect capacitance at a position of human eyes.

In an embodiment, the lens includes an inner surface facing a user and an outer surface facing away from the user; the transparent electrode layer is provided on the inner surface of the lens; or the transparent electrode layer is provided on the outer surface of the lens; or the transparent electrode layer is provided between the inner surface of the lens and the outer surface of the lens.

In an embodiment, the transparent electrode layer is of a single-electrode type or a multi-electrode type, the eyeglass frame includes a frame body, a first temple and a second temple, and the lens is provided on the frame body, the first temple and the second temple are provided on opposite sides of the frame body, and the surface of the lens includes a transverse direction extending from the first temple to the second temple and a longitudinal direction perpendicular to the transverse direction; in response to that the transparent electrode layer is of the single-electrode type, the transparent electrode layer is laid on the surface of the lens; in response to that the transparent electrode layer is of the multi-electrode type, the transparent electrode layer includes a plurality of electrode arrays extending along the transverse direction of the lens and arranged along the longitudinal direction of the lens.

In an embodiment, the near-eye display device also includes a wearing detector; a driver; and a processor; the wearing detector, the driver and the processor are all provided on the eyeglass frame, the processor is electrically connected to the wearing detector and the driver respectively, the driver is electrically connected to the transparent electrode layer, and the driver is configured to drive the transparent electrode layer to detect the capacitance.

In addition, in order to achieve the above purpose, the present application also provides an eye command recognition method, applied to the near-eye display device as described above, including:
controlling a transparent electrode layer of the near-eye display device to obtain capacitance information at a position of human eyes;
determining motion of the human eyes based on the capacitance information; and
converting the determined motion of the human eyes into control commands for controlling the near-eye display device.

In an embodiment, the capacitance information includes a capacitance value, and the capacitance detection of the transparent electrode layer is a self-capacitance detection;
the determining motion of the human eyes based on the capacitance information includes:
comparing the capacitance value with a pre-stored standard capacitance value;
determining that the human eye is in an eye-closed state, in response to that the capacitance value is greater than the standard capacitance value;
comparing this comparison result with the previous comparison result;
in response to that the comparison results are the same, continuing to perform the comparing the capacitance value with the prestored standard capacitance value; and
in response to that the comparison results are different, determining that an eye-closed motion of the human eyes occurs.

In an embodiment, after the comparing the capacitance value with the pre-stored standard capacitance value, the method further includes:
determining that the human eyes are in an eye-open state, in response to that the capacitance value is less than or equal to the standard capacitance value;
comparing this comparison result with the previous comparison result;
in response to that the comparison results are the same, continuing to perform the comparing the capacitance value with the pre-stored standard capacitance value; and
in response to that the comparison results are different, determining that an eye-open motion of the human eyes occurs.

In an embodiment, the determining motion of the human eye based on the capacitance information further includes:

in response to that an interval between the eye-closed motion and the eye-open motion is less than a first preset time, determining that the human eye is a blink motion.

In an embodiment, the capacitance information includes a capacitance waveform that changes with time;

the determining the motion of the human eyes based on the capacitance information includes:

comparing the capacitance waveform at a second preset time with pre-stored standard waveform data to generate a comparison result; and determining the motion of the human eyes based on the comparison result.

In an embodiment, the comparing the capacitance waveform at the second preset time with the pre-stored standard waveform data includes:

extracting waveform feature points in the capacitance waveform during the second preset time; and comparing the waveform feature points with the pre-stored standard waveform data.

In an embodiment, the comparing the capacitance waveform at the second preset time with the pre-stored standard waveform data includes:

intercepting the capacitance waveform during the second preset time to obtain a waveform segment; and comparing the waveform segment with the pre-stored standard waveform data.

In an embodiment, before the controlling the transparent electrode layer to obtain the capacitance information at the position of the human eyes, the method further includes:

detecting whether the user wears the near-eye display device, and generating a detection command and transmitting the detection command to the transparent electrode layer in response to that the user wears the near-eye display device.

In addition, in order to achieve the above objective, the present application also provides a readable storage medium, on which an eye command recognition program is stored. when the eye command recognition program is executed by a processor, steps of the eye command recognition method as described above are implemented.

In the technical solution proposed by the present application, when the user uses the near-eye display device, the human eye views the display screen through the lens. A transparent electrode layer is provided at the position of the lens. When the human eye is open or closed, the capacitance detected by the transparent electrode layer changes. When the eyelids of the human eye open and close, the skin of the eyelids causes the capacitance of the transparent electrode layer to increase or decrease. Different capacitance changes represent different control commands. In this way, the control of the near-eye display device can be completed through the human eye. The technical solution of the present application realizes the control of the near-eye display device through the human eye, frees the user's hands, reduces the switching of the hands between two different work processes, thereby improving the user's efficiency in using the near-eye display device.

BRIEF DESCRIPTION OF THE DRAWINGS

In order to describe the technical solutions in the embodiments of the present application or in the related art more clearly, the accompanying drawings required to be used in the description of the embodiments or the related art will be briefly introduced below. Obviously, the accompanying drawings in the following description are only some embodiments of the present application. For those skilled in the art, other drawings can be obtained based on the structures shown in these drawings without creative efforts.

The realization of the purpose, functional features and advantages of the present application will be further described in conjunction with the embodiments, with reference to the accompanying drawings.

DETAILED DESCRIPTION OF THE EMBODIMENTS

The technical solutions in the embodiments of the present application will be clearly and completely described below with reference to the accompanying drawings in the embodiments of the present application. Obviously, the described embodiments are only some rather than all of the embodiments of the present application. Based on the embodiments in the present application, all other embodiments obtained by those skilled in the art without creative efforts fall within the scope of the present application.

Figure 1:
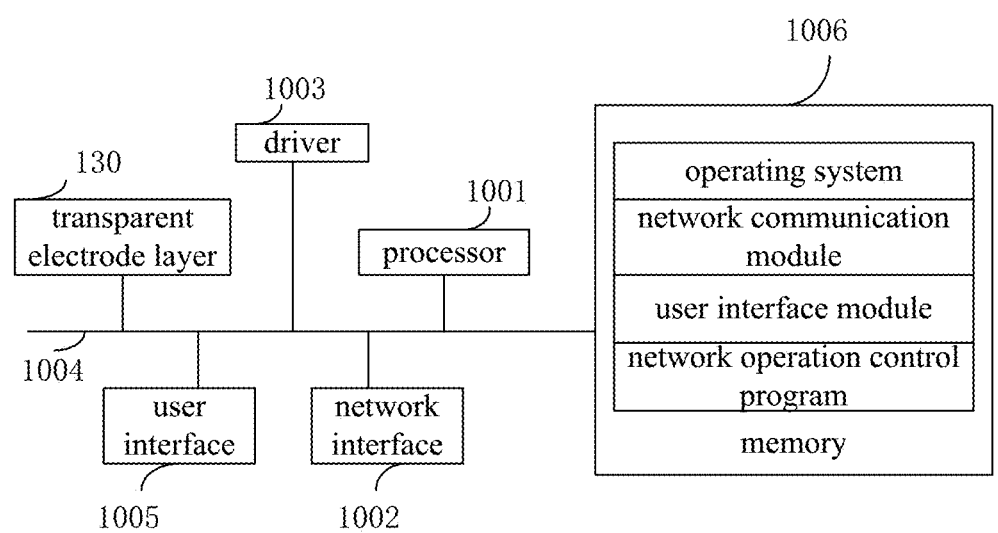
FIG. 1 is a hardware framework diagram of a near-eye display device according to an embodiment of the present application.

As shown in FIG. 1, a near-eye display device 10 is introduced below. The near-eye display device 10 includes: a processor 1001, such as a central processing unit (CPU). The near-eye display device 10 also includes a memory 1006, a user interface 1005, a network interface 1002, a communication bus 1004, a transparent electrode layer 130 and a driver 1003. The communication bus 1004 is configured to realize connection communication between these devices. The user interface 1005 can include various interfaces for uploading data or downloading data. The network interface 1002 can include a standard wired interface or a wireless interface (such as a WI-FI interface). The memory 1006 can be a high-speed random access memory (RAM) memory 1006 or a stable memory 1006 (Non-Volatile Memory), such as a magnetic disk memory 1006. The memory 1006 can optionally be a storage device independent of the aforementioned processor 1001.

Figure 2:
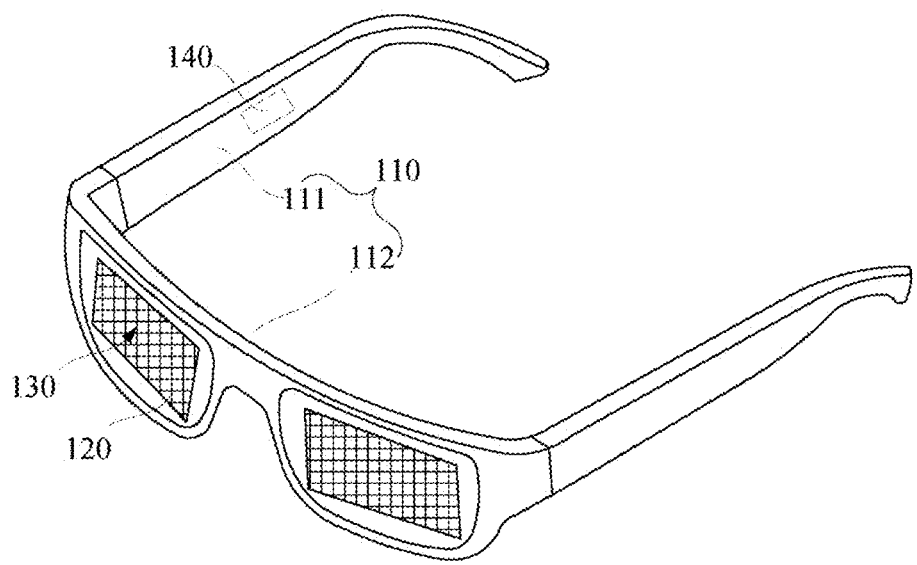
FIG. 2 is a schematic structural diagram of the near-eye display device according to an embodiment of the present application.

As shown in FIG. 2, the present application proposes a near-eye display device 10. The near-eye display device 10 is also called a head-mounted display device or a head-mounted display. The display principles of the near-eye display device 10 include various types, such as augmented reality (AR) display and virtual reality (VR) display. The display principle of the near-eye display device 10 can be AR display or VR display. The near-eye display device 10 includes a eyeglass frame 110, a lens 120 and a transparent electrode layer 130. The lens 120 is arranged on the eyeglass frame 110, and the transparent electrode layer 130 is arranged on the lens 120.

The eyeglass frame 110 is provided to facilitate the user to wear the near-eye display device 10. When the user uses the near-eye display device 10, the eyeglass frame 110 is clipped onto the person's face. The eyeglass frame 110 includes a frame body 112 and temples 111. The lens 120 is provided in the eyeglass frame 110, that is, the lens 120 is provided in the frame body 112. The frame body 112 is provided with a nose pad. When the user wears the near-eye display device 10, the nose pad is stuck at the nose of the user and the temples 111 are stuck at ears, thereby completing the wearing of the near-eye display device 10.

Figure 10:
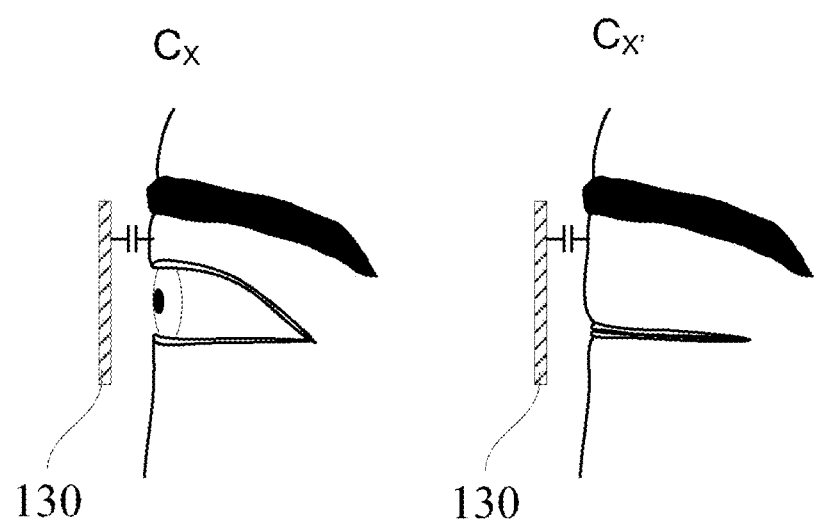
FIG. 10 is a schematic diagram of a detection capacitor in the present application.
Figure 11:
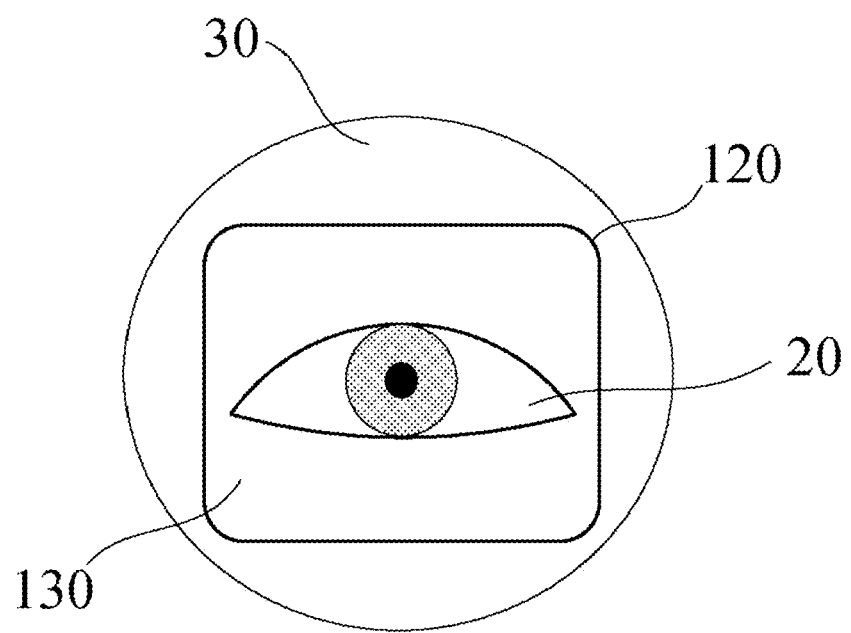
FIG. 11 is a schematic diagram of a user's eye-open state in the present application.
Figure 12:
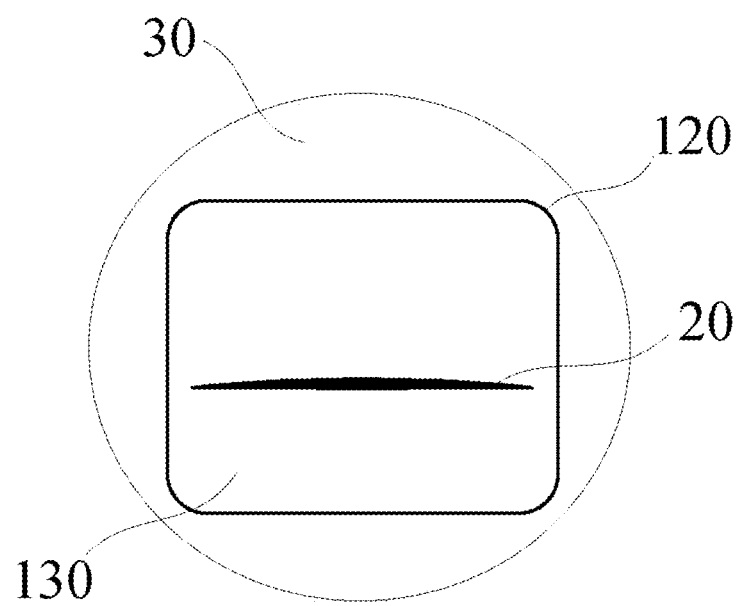
FIG. 12 is a schematic diagram of a user's eye-closed state in the present application.

The transparent electrode layer 130 is provided on the lens 120. The transparent electrode layer 130 can be pasted to the lens 120 or coated on the lens 120. The pasting method is easy to operate, and the transparent electrode layer 130 can be pasted through optical glue. The coating method can improve the density and firmness of the film layer. The transparent electrode layer 130 is configured to detect capacitance changes at the position of the human eye 20. There are at least two principles for the transparent electrode layer 130 to detect capacitance changes, namely self-capacitance detection and mutual-capacitance detection. The self-capacitance uses one pin and measures the capacitance between the pin and the power ground. That is, the current on the pin connected to the sensor is driven. As the skin is brought close to the transparent electrode layer 130, the capacitance of the system will increase, and the voltage will also increase. The change in the measured voltage can detect whether there is skin contact. Mutual-capacitance induction technology uses two capacitors, one is a transmitting electrode and the other is a receiving electrode. The receiving electrode provides a digital voltage and measures the charge received on the transmitting electrode. The charge received on the transmitting electrode is proportional to the mutual capacitance between the two electrodes. When the receiving and transmitting electrodes are close to the skin, the mutual capacitance decreases, so the charge received on the transmitting electrode will also decrease. Therefore, by detecting the charge on the transmitting electrode, the state of the human eye 20 can be detected. When the user wears the near-eye display device 10, although the skin of the eye does not directly contact the transparent electrode layer 130, the skin of the human eye 20 is very close to the transparent electrode layer 130, which can also cause the capacitance changes. As shown in FIG. 10, when the human eye 20 is opened and closed, the area of the transparent electrode layer 130 covered by an upper eyelid changes. The capacitance detected when the eyes are open is Cx, and the capacitance detected when the eyes are closed is Cx'. The change value of the capacitance is $\Delta C$, then $\Delta C=Cx-Cx'$. As shown in FIG. 11 and FIG. 12, the human eye 20 includes an eyeball and an upper eyelid covering the eyeball. The human eye 20 is located in the human eye area 30. It can be seen again that when the human eye 20 is opened and closed, areas of the transparent electrode layer 130 covered by the upper eyelid are different. In this way, the transparent electrode layer 130 can detect changes in capacitance. The transparent electrode layer 130 includes a conductive film, such as indium tin oxide (ITO) conductive film.

In the technical solution proposed in the present embodiment, when the user uses the near-eye display device 10, the human eyes 20 view the display screen through the lens 120. The transparent electrode layer 130 is provided at the position of the lens 120. When the human eye 20 is open or closed, the capacitance detected by the transparent electrode layer 130 changes. When the eyelids of the human eye 20 are opened and closed, the skin of the eyelids causes the capacitance of the transparent electrode layer 130 to increase or decrease. Different changes in the capacitance represent different control instructions. In this way, the near-eye display device 10 can be controlled through the human eye 20. The technical solution of this embodiment completes the control of the near-eye display device 10 through the human eye 20, frees the user's hands, and reduces the switching of the hands between two different work processes, thereby improving the user's efficiency in using the near-eye display device 10.

Figure 3:
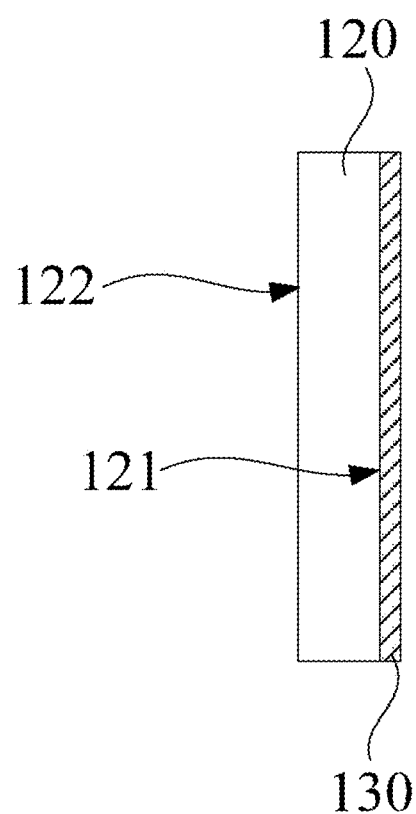
FIG. 3 is a schematic structural diagram of positions of a lens and a transparent electrode layer according to a first embodiment of the present application.

In the above embodiment, the lens 120 includes an inner surface 121 of the lens facing the user and an outer surface 122 of the lens facing away from the user. The transparent electrode layer 130 can be provided in various positions. As shown in FIG. 3, in the first case, the transparent electrode layer 130 is provided on the inner surface 121 of the lens; and the transparent electrode layer 130 is provided to face the human eye 20 of the user. At this point, the transparent electrode layer 130 is closest to the human eye 20, which can improve the detection sensitivity.

Figure 4:
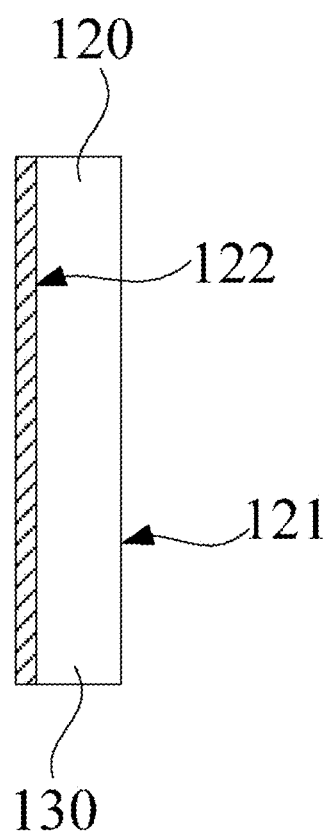
FIG. 4 is a schematic structural diagram of positions of a lens and a transparent electrode layer according to a second embodiment of the present application.

As shown in FIG. 4, in the second case, the transparent electrode layer 130 is provided on the outer surface 122 of the lens; since the transparent electrode layer 130 is a chemical substance, this can prevent the user's skin from contacting the transparent electrode layer 130 and protect the user's body.

Figure 5:
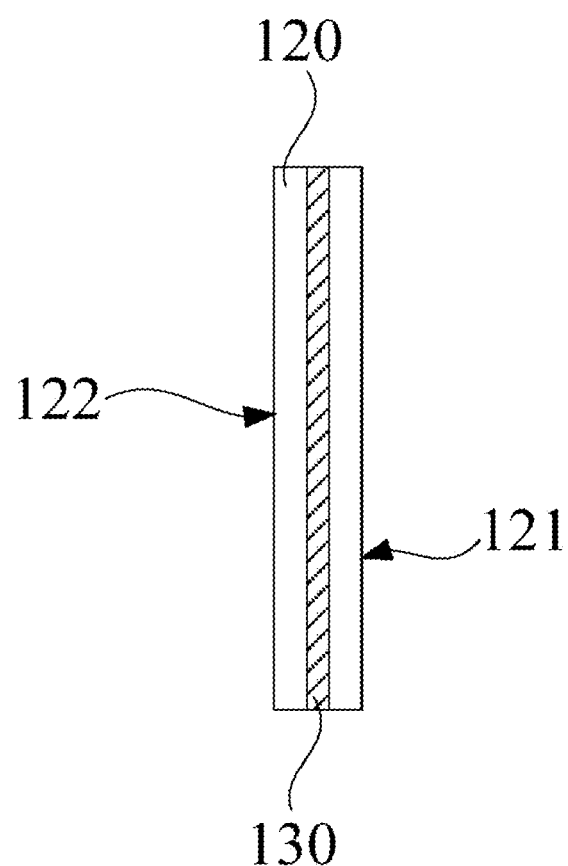
FIG. 5 is a schematic structural diagram of positions of a lens and a transparent electrode layer according to a third embodiment of the present application.

As shown in FIG. 5, in the third case, the transparent electrode layer 130 is provided between the inner surface 121 of the lens and the outer surface 122 of the lens. The lens 120 can be a single lens 120, so that the transparent electrode layer 130 is embedded in the lens 120. The lens 120 can also be a lens 120 group composed of multiple lenses 120, and the transparent electrode layer 130 is sandwiched between the multiple lenses 120. In this way, the transparent electrode layer 130 has less contact with the external environment, and the lens 120 can form a protection for the transparent electrode layer 130 to prevent the transparent electrode layer 130 from being damaged by external forces.

In another embodiment of the present application, the transparent electrode layer 130 is of a single-electrode type or a multi-electrode type. The eyeglass frame 110 includes a frame body 112, a first temple 111 and a second temple 111. The lens 120 is provided on the frame body 112. The first temple 111 and the second temple 111 are respectively provided on opposite sides of the frame body 112. The frame body 112 can surround a periphery of the lens 120, or can half surround the periphery of the lens 120. The surface of the lens 120 includes a transverse direction extending from the first temple 111 to the second temple 111 and a longitudinal direction perpendicular to the transverse direction.

Figure 6:
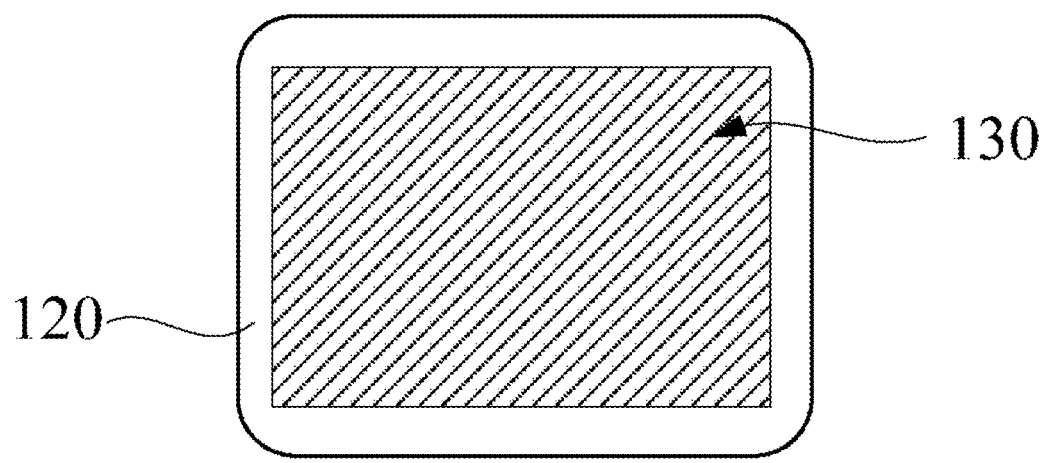
FIG. 6 is a schematic structural diagram of a first embodiment of arrangement of the transparent electrode layer in FIG. 2.

As shown in FIG. 6, when the transparent electrode layer 130 is of the single-electrode type, the transparent electrode layer 130 is laid on the surface of the lens 120; at this time, the transparent electrode layer 130 can be laid on the entire surface of the lens 120, or can be laid on the corresponding position of the human eye 20. Laying on the entire surface can increase the area of capacitance detection, reduce detection blind spots, and improve detection accuracy. The transparent electrode layer 130 can also be provided corresponding to the position of the human eye 20, that is, the transparent electrode layer 130 is provided at a partial position, which can reduce the laying area of the transparent electrode layer 130 and ensure the detection of the state of the human eye 20.

Figure 7:
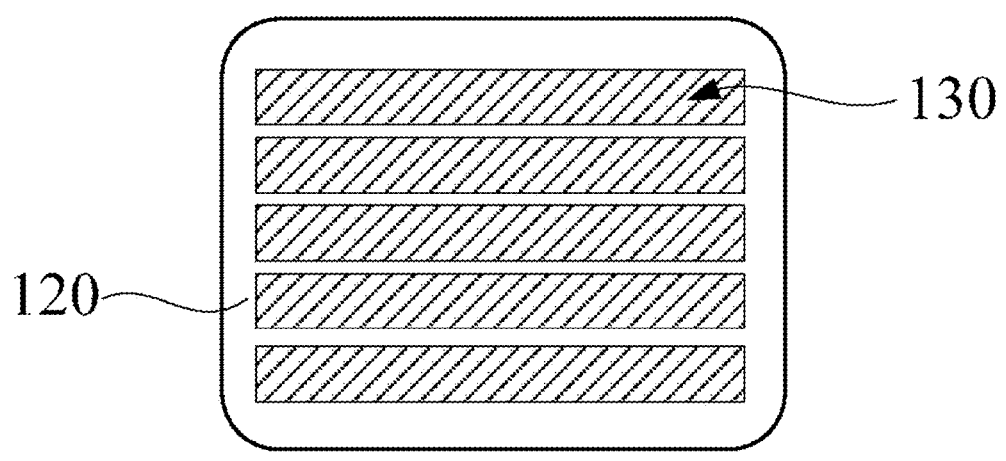
FIG. 7 is a schematic structural diagram of a second embodiment of arrangement of the transparent electrode layer in FIG. 2.
Figure 8:
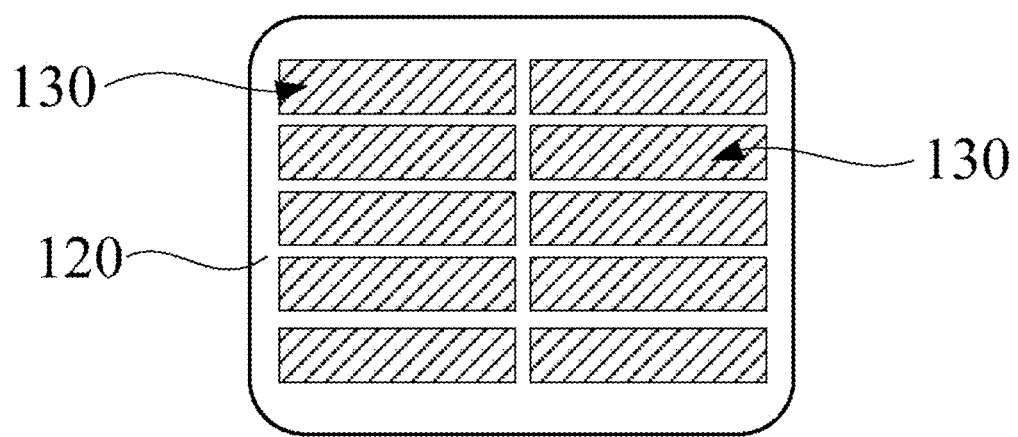
FIG. 8 is a schematic structural diagram of a third embodiment of arrangement of the transparent electrode layer in FIG. 2.
Figure 9:
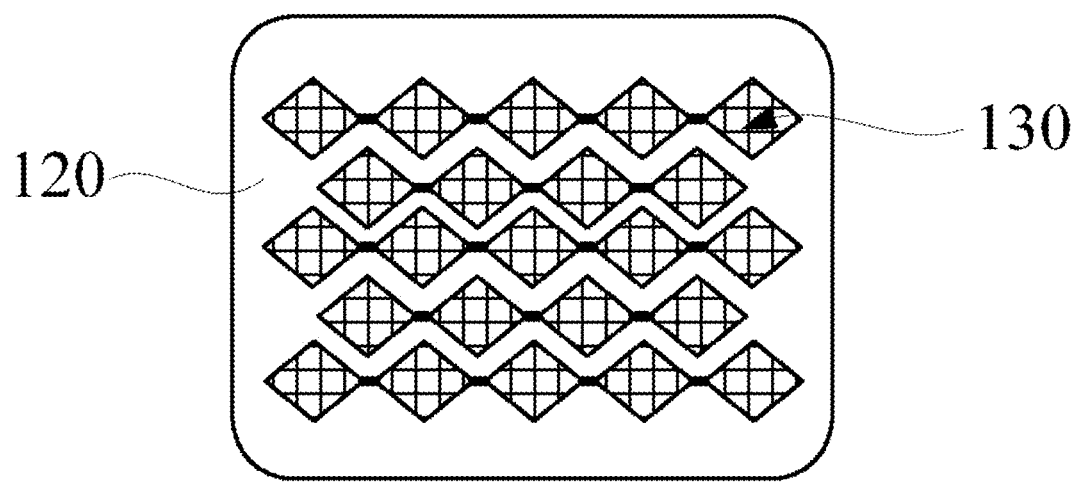
FIG. 9 is a schematic structural diagram of a fourth embodiment of arrangement of the transparent electrode layer in FIG. 2.

As shown in FIG. 7, when the transparent electrode layer 130 is of the multi-electrode type, the transparent electrode layer 130 includes a plurality of electrode arrays, and the plurality of electrode arrays extend along the transverse direction of the lens 120 and are arranged along the longitudinal direction of the lens 120. The multi-electrode type can improve the accuracy of detecting the state of the human eye 20. When the human eye 20 is opened or closed, the flipping of the upper eyelid will correspond to different electrodes arranged vertically, so that the position of the upper eyelid can be accurately detected through the capacitance changes of the different electrodes. Through the multi-electrode setting, it not only can detect eye-open and eye-closed states, but also detect squinting state. For example, the multi-electrode electrode array is arranged in five electrode arrays, and the five electrode arrays include a first array, a second array, a third array, a fourth array and a fifth array. The first array, the second array, the third array, the fourth array and the fifth array are arranged in sequence along the longitudinal direction. For example, when the upper eyelid is located in the first array, the eye is open, and when the upper eyelid is located in the fifth array, the eye is closed. When the upper eyelid is located in the second array, the human eye 20 is in a half-open state. When the upper eyelid is located in the third array or the fourth array, the human eye 20 is in a squinting state. Each electrode array can be arranged in various ways. As shown in FIG. 8, for example, the electrode array includes strips distributed parallel to each other, and each strip-shaped electrode array can also be arranged in segments. As shown in FIG. 9, in addition, each array can also include multiple rhombus patterns, and each rhombus pattern is connected laterally in sequence. Through this segmented setting and the distribution of multiple patterns, the precision of detection can be improved.

As shown in FIG. 1 again, in another embodiment of the present application, in order to ensure that the detection of the human eye 20 can be successfully completed, the near-eye display device 10 also includes a wearing detector 140, a driver 1003 and a processor 1001. The wearing detector 140, the driver 1003 and the processor 1001 are all provided on the eyeglass frame 110. The wearing detector 140 can be provided on an inner side of the temples 111. When the user wears the near-eye display device 10, the wearing detector 140 can detect the user approaching, and generate a wearing signal. The processor 1001 is electrically connected to the wearing detector 140 and the driver 1003 respectively. The driver 1003 is electrically connected to the transparent electrode layer 130. The driver 1003 is used to drive the transparent electrode layer 130 to perform capacitance detection. The wearing detector 140 transmits the wearing signal to the processor 1001. The processor 1001 and the wearing signal generate a driving signal. The processor 1001 transmits the driving signal to the driver 1003. The driver 1003 generates a detection command. The transparent electrode layer 130 activates the detection of capacitance under the action of the detection command.

Figure 13:
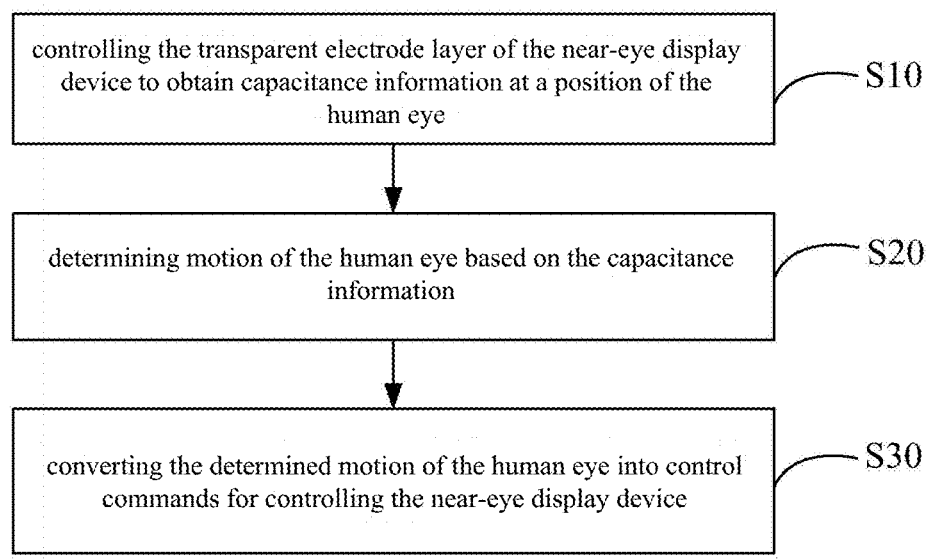
FIG. 13 is a schematic flowchart of an eye command recognition method according to a first embodiment of the present application.

As shown in FIG. 13, the present application also provides an eye command recognition method. The eye command recognition method provides a first embodiment. The recognition method is applied to the above near-eye display device. The recognition method includes:

Step S10, controlling the transparent electrode layer of the near-eye display device to obtain capacitance information at a position of the human eye; the human eye is close to the transparent electrode layer of the lens, and during the opening and closing of the upper eyelid, the human skin conducts electricity. When the upper eyelid is close to the transparent electrode layer, it will cause a change in the amount of charge, which will cause a change in capacitance, and the amount of change in charge of the upper eyelid at different positions is also different, so the capacitance detected will also be different. It can be seen that the detection command is transmitted to the transparent electrode layer, and the transparent electrode layer detects the capacitance at the position of the human eye under the action of the detection command, thereby obtaining the capacitance information at the position of the human eye.

Step S20, determining motion of the human eye based on the capacitance information; due to different capacitance changes generated by the human eye during blinking or closing, that is to say, different capacitance values represent different states of the human eye, and different capacitance changes represents the different motion of the human eye. Through these different capacitance values, it is possible to determine which motion the human eye has performed.

Step S30, converting the determined motion of the human eye into control commands for controlling the near-eye display device. After the motion of the human eye is determined, corresponding control instructions are generated based on the motion of the human eye, and the near-eye display device completes corresponding operations based on these control commands. Thus, the control of the near-eye display device can be completed through the human eye.

In this embodiment, when the user uses the near-eye display device, the human eyes view the display screen through the lenses. A transparent electrode layer is provided at the position of the lens. When the human eye is open or closed, the capacitance detected by the transparent electrode layer changes. When the eyelids of the human eye open and close, the skin of the eyelids causes the capacitance of the transparent electrode layer to increase or decrease. Different capacitance changes represent different control instructions. In this way, the control of the near-eye display device can be completed through the human eye. The technical solution of the present application completes the control of the near-eye display device through the human eye, frees the user's hands, reduces the switching of the hands between two different work processes, thereby improving the user's efficiency in using the near-eye display device.

Figure 14:
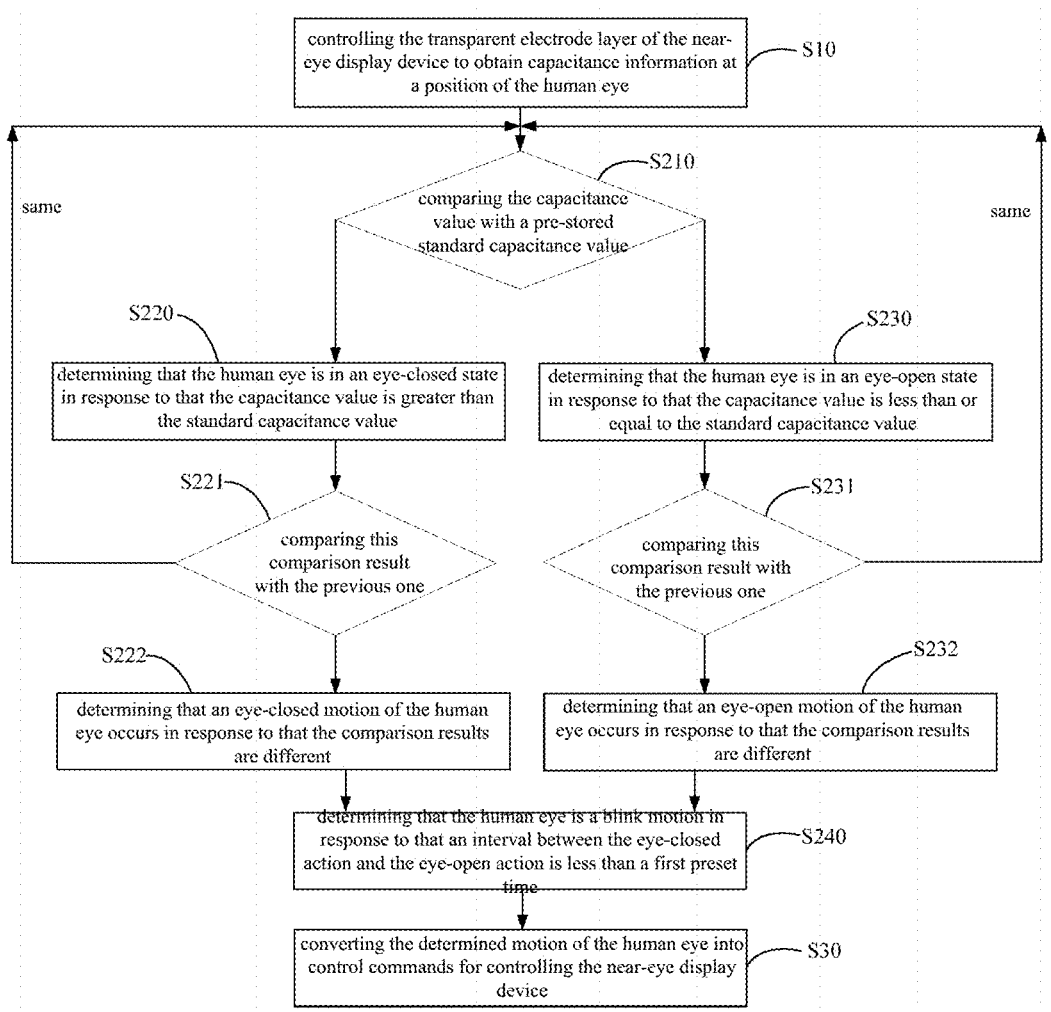
FIG. 14 is a schematic flowchart of the eye command recognition method according to a second embodiment of the present application.

As shown in FIG. 14, there are at least two capacitance detection principles of the transparent electrode layer, one is the mutual-capacitance type and the other is the self-capacitance type. When the transparent electrode layer adopts the self-capacitance type, if the skin around the eye is close to the transparent electrode layer, the capacitance will increase. The transparent electrode layer adopts mutual capacitance type, if the skin around the eye is close to the transparent electrode layer, the capacitance will decrease. On the basis of the first embodiment of the eye instruction recognition method, a second embodiment is proposed. The capacitance information includes the capacitance value, and the capacitance detection of the transparent electrode layer is a self-capacitance detection.

The step of determining the motion of the human eye based on the capacitance information includes the following steps.

Step S210, comparing the capacitance value with a pre-stored standard capacitance value; the standard capacitance value is preset and stored in a memory. After obtaining the capacitance value at the position of the human eye, the standard capacitance value is retrieved from the memory for comparison. The standard capacitance value can be understood as a fixed value or as a range value. When the standard capacitance value is the range value, the capacitance value will be compared with the maximum and minimum values in the range value.

Step S220, determining that the human eye is in an eye-closed state in response to that the capacitance value is greater than the standard capacitance value; at this time, the principle of the transparent electrode layer to detect capacitance changes is to adopt the self-capacitance detection. At the position covered by the skin, the capacitance value is larger. If the capacitance value is greater than the standard capacitance value, it means that the area covered by the eyelids is larger, and it is determined that the human eyes is in the eye-closed state.

Step S221, comparing this comparison result with the previous one; after determining the current state of the human eye, it is also necessary to determine the motion of the human eye. It is to compare the comparison results obtained from the previous detection with the current comparison results to determine whether the state of the human eye has changed. If there is a change, it means that the human eye has performed the instructive motion. If there is no change, it means that the human eye has maintained its original state.

If the comparison results are the same, continue to perform the step of controlling the transparent electrode layer to obtain the capacitance information at the position of the human eye; the same means that the state of the human eye has not changed, and the user has not issued an instruction action at this time. At this time, continue to control the transparent electrode layer to obtain the capacitance information at the position of the human eye.

Step S222, determining that an eye-closed motion of the human eye occurs in response to that the comparison results are different. In response to that the comparison results are different, it means that the state of the human eye has changed. Due to the fact that different determination is made in the eye-closed state of the human eye, that is to say, the human eye is in the eye-closed state, if the comparison results are different, it means that the human eye was in the eye-open state last time, and the change from the eye-open state to the eye-closed state indicates the human eye performs the eye-closed motion.

On the basis of the second embodiment of the present application, a third embodiment of the present application is proposed. After the step of comparing the capacitance value with the pre-stored standard capacitance value, the method also includes the following steps.

Step S230, determining that the human eye is in an eye-open state in response to that the capacitance value is less than or equal to the standard capacitance value; after obtaining the capacitance value at the position of the human eye, the standard capacitance value is retrieved from the memory for comparison. The transparent electrode layer adopts the self-capacitance principle for detection. In areas not covered by the skin, the capacitance value is small. If the capacitance value is less than or equal to the standard capacitance value, it means that the area covered by the eyelids is small, and the human eyes are determined to be in the eye-open state.

Step S231, comparing this comparison result with the previous one; after determining the current state of the human eye, it is also necessary to determine the motion of the human eye. It is to compare the comparison results obtained from the previous detection with the current comparison results to determine whether the state of the human eye has changed. If there is a change, it means that the human eye has performed the instructive motion. If there is no change, it means that the human eye has maintained its original state.

If the comparison results are the same, continue to perform the step of controlling the transparent electrode layer to obtain the capacitance information at the position of the human eye; the same means that the state of the human eye has not changed, and the user has not issued an instruction action at this time. At this time, continue to control the transparent electrode layer to obtain the capacitance information at the position of the human eye.

Step S232, determining that an eye-open motion of the human eye occurs in response to that the comparison results are different. In response to that the comparison results are different, it means that the state of the human eye has changed. Due to the fact that different determination is made in the eye-open state of the human eye, that is to say, the human eye is in the eye-open state, if the comparison results are different, it means that the human eye was in the eye-closed state last time, and the change from the eye-closed state to the eye-open state indicates the human eye performs the eye-open motion.

On the basis of the third embodiment of the present application, a fourth embodiment of the present application is proposed. The step of determining the motion of the human eye based on the capacitance information also includes:

step S240, determining that the human eye is a blink motion in response to that the interval time between the eye-closed motion and the eye-open motion is less than a first preset time. The preset time can be changed. The first preset time is stored in the memory in advance, and the first preset time can be extracted when needed. For example, the first preset time is 1 second. If the interval time between the eye-closed motion and the eye-open motion is less than 1 second, it means that the user has performed the blink motion. In addition, the preset time can be 0.8 seconds, 0.5 seconds or 1.5 seconds.

It should be noted that in order to further subdivide the operation control, the number of blinks can also be recorded, and the control of the near-eye display device can be completed through the number of blinks. For example, blinking once represents selecting brightness, and blinking twice represents controlling volume.

Figure 15:
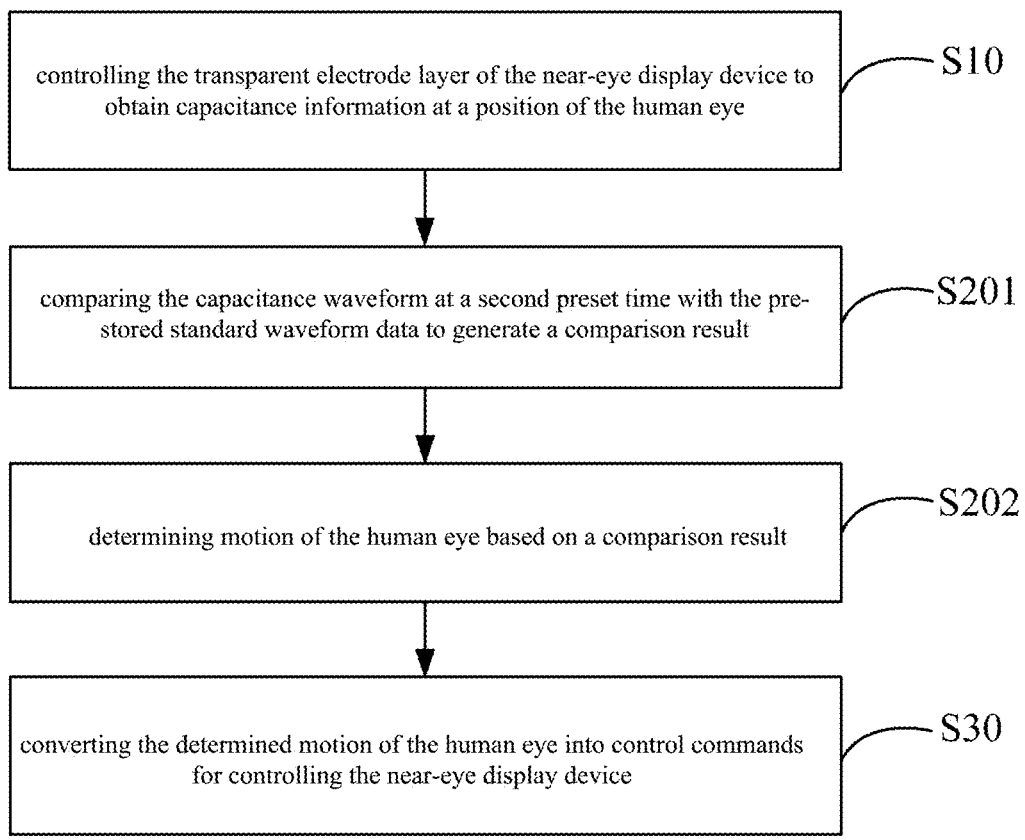
FIG. 15 is a schematic flowchart of the eye command recognition method according to a fifth embodiment of the present application.

As shown in FIG. 15, on the basis of the first embodiment of the present application, a fifth embodiment of the present application is proposed. The capacitance information includes a capacitance waveform that changes with time; at this time, the detection principle of the transparent electrode layer can be either mutual-capacitance or self-capacitance. The capacitance changes over time is recorded to obtain the capacitance waveform over time.

The step of determining the motion of the human eye based on the capacitance information includes the following steps.

Step S201, comparing the capacitance waveform at a second preset time with the pre-stored standard waveform data to generate a comparison result; comparing the two waveforms to check whether the two waveforms overlap or what the degree of overlap is, or check which positions of the capacitance waveform conform to the standard waveform data. Furthermore, the current state of the human eye can be determined by comparing the capacitance waveform with the standard waveform. The different overlap degrees of the capacitance waveform and the pre-stored standard waveform are set to represent different situations. Through the overlap degree, it is possible to understand the meaning of the capacitance waveform at the second preset time.

Step S202, determining the motion of the human eye based on a comparison result. By comparing the capacitance waveform with the pre-stored standard waveform data, it is possible to learn what motion the human eye has performed, such as whether the human eye has opened, closed or blinked. Through these different motion of the human eye, it can be concluded that the user needs to issue specific control instructions to the near-eye display device.

Figure 16:
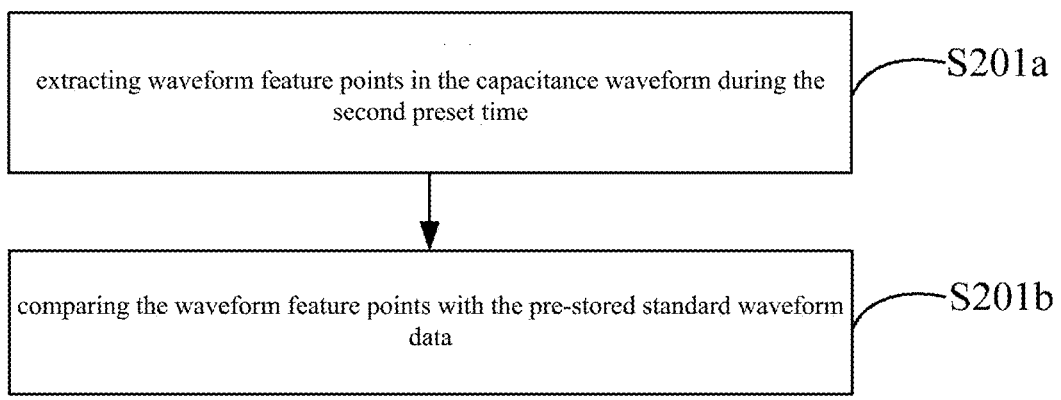
FIG. 16 is a schematic flowchart of the eye command recognition method according to a sixth embodiment of the present application.

As shown in FIG. 16, on the basis of the fifth embodiment of the present application, a sixth embodiment of the present application is proposed. The step of comparing the capacitance waveform at the second preset time with pre-stored standard waveform data includes the following steps.

Step S201a, extracting waveform feature points in the capacitance waveform during the second preset time. By extracting the waveform feature points, the amount of data required for comparison between the entire capacitance waveform and standard data can be reduced, thereby reducing the computational load of the processor, improving computational efficiency of the computer, and enabling the human eye to respond faster as a means of operation. The second preset time is a time period, during which the capacitance waveform period is extracted. The range of the second preset time can be adjusted, shortened or expanded, and the starting point and ending point of the same time can also be changed accordingly.

Step S201b, comparing the waveform feature points with the pre-stored standard waveform data. The capacitance waveform has high points and low points. The high points or low points can be used as the waveform feature points, and these high points or low points are compared with the pre-stored standard waveform data.

Figure 17:
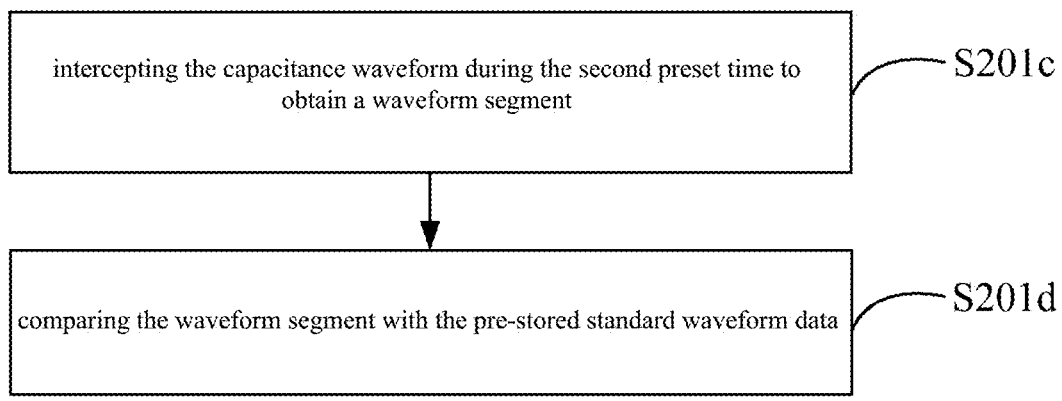
FIG. 17 is a schematic flowchart of the eye command recognition method according to a seventh embodiment of the present application.

In addition, as shown in FIG. 17, on the basis of the fifth embodiment of the present application, a seventh embodiment of the present application is proposed. The step of comparing the capacitance waveform at the second preset time with pre-stored standard waveform data includes the following steps.

Step S201c, intercepting the capacitance waveform during the second preset time to obtain a waveform segment; intercepting the entire capacitance waveform within a period of time to obtain a waveform segment.

The time period for intercepting the capacitance waveform can be a preset time interval, that is, the second preset time.

Step S201d, comparing the waveform segment with the pre-stored standard waveform data. What can be known in this way is the capacitance change during a certain time. Similarly, the above method can also reduce the amount of data required to compare the entire capacitance waveform with standard data. By comparing only a portion of the waveform, the state of the human eye can be determined, and the response time of the near-eye display device can also be improved.

Figure 18:
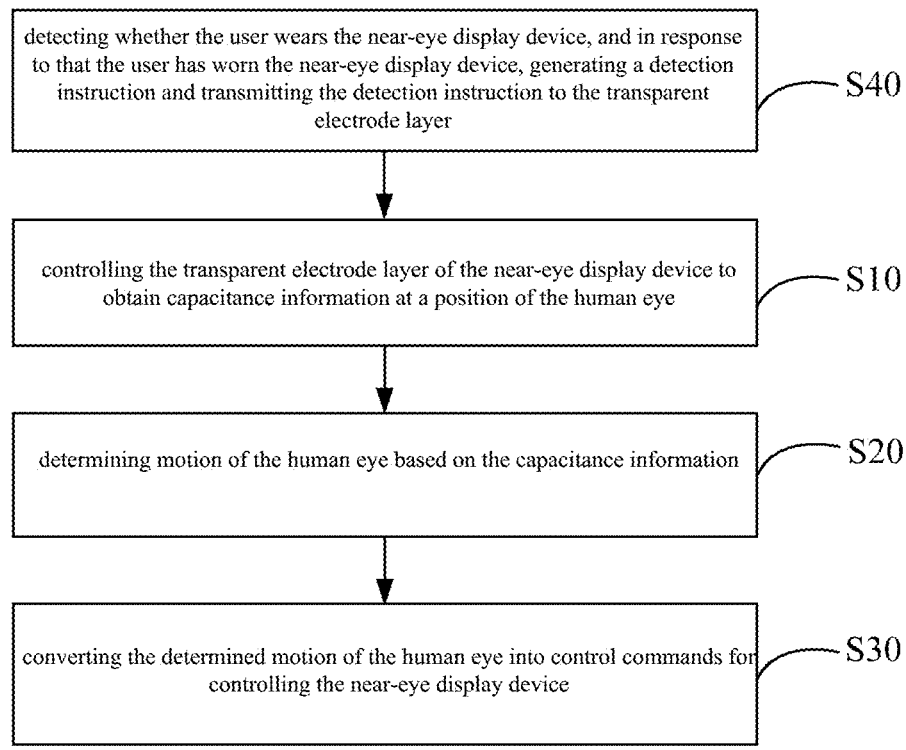
FIG. 18 is a schematic flowchart of the eye command recognition method according to an eighth embodiment of the present application.

Furthermore, as shown in FIG. 18, on the basis of the above embodiment, an eighth embodiment of the present application is proposed. Before the step of controlling the transparent electrode layer to obtain the capacitance information at the position of the human eye, the method also includes:

step S40, detecting whether the user wears the near-eye display device, and in response to that the user has worn the near-eye display device, generating a detection instruction and transmitting the detection instruction to the transparent electrode layer. For example, a wearing detector is provided at the temple position, the wearing detector is a proximity switch, and the proximity switch is provided on the inner side of the temple facing the user. In order to ensure the accuracy of detection, two proximity switches can be provided. Only after both proximity switches detect the user, it is determined that the user has worn the near-eye display device. The proximity switch can be an infrared detector, etc. After detecting that the user has worn the near-eye display device, the wearing detector generates a wearing signal indicating that the user has worn the near-eye display device. The wearing detector transmits the wearing signal to the processor. The processor generates a driving signal based on the wearing signal and transmits the driving signal to the driver. Under the action of the driving signal, the driver transmits the detection command to the near-eye display device, and the transparent electrode layer starts to energize and work according to the detection command.

The present application also provides a readable storage medium. The memory of the readable storage medium can include an operating system, a network communication module, a user interface module and a near-eye display device startup program. The operating system is a program that manages and controls the hardware and software resources of the near-eye display device, and supports the operation of the near-eye display device startup program and other software or programs. In the near-eye display device shown in FIG. 1, the network interface is mainly used for data communication with the backend server; the processor can be used to call the near-eye display device startup program stored in the memory, and execute steps of the eye command identification method as described above.

For specific implementations of the computer-readable storage medium of the present application, reference may be made to the above embodiments of the eye command recognition method, which will not be described again here.

It should be noted that, as used herein, the terms "include", "comprise" or any other variation thereof are intended to cover a non-exclusive inclusion, such that a process, method, article or system that includes a list of elements not only includes those elements, but also includes other elements that are not explicitly listed or elements that are inherent to the process, method, article or system. Without further limitations, an element defined by the statement "includes a . . . " does not exclude the presence of other identical elements in the process, method, article, or system that includes that element.

The above serial numbers of the embodiments of the present application are only for description and do not represent the advantages or disadvantages of the embodiments.

Through the above description of the embodiments, those skilled in the art can clearly understand that the methods of the above embodiments can be implemented by means of software and the necessary general hardware platform, of course, also by hardware, but in many cases the former is better implementation. Based on this understanding, the technical solution of the present application essentially, or the part that contributes to the related art, can be embodied in the form of a software product. The computer software product is stored in a storage medium (such as ROM/RAM, magnetic disk, optical disk) as described above, including several instructions to cause a terminal device (which can be a mobile phone, computer, server, or network device, etc.) to execute the methods described in various embodiments of the present application.

The above are only some embodiments of the present application, and do not limit the scope of the present application. Under the concept of the present application, equivalent structural transformations made by using the contents of the description and drawings of the present application, or directly/indirectly applied in other relevant technical fields, are included in the scope of the present application.

What is claimed is:

1. A near-eye display device, comprising:
   an eyeglass frame;
   a lens provided on the eyeglass frame;
   a transparent electrode layer provided on the lens;
   wherein the transparent electrode layer is configured to detect capacitance at a position of human eyes,
   the transparent electrode layer is of a single-electrode type or a multi-electrode type, the eyeglass frame comprises a frame body, a first temple and a second temple, and the lens is provided on the frame body, the first temple and the second temple are provided on opposite sides of the frame body, and the surface of the lens comprises a transverse direction extending from the first temple to the second temple and a longitudinal direction perpendicular to the transverse direction;
   in response to that the transparent electrode layer is of the single-electrode type, the transparent electrode layer is laid on the surface of the lens;
   in response to that the transparent electrode layer is of the multi-electrode type, the transparent electrode layer comprises a plurality of electrode arrays extending along the transverse direction of the lens and arranged along the longitudinal direction of the lens, and
   wherein the transparent electrode layer of the multi-electrode type is arranged in five electrode arrays, and the five electrode arrays comprise a first array, a second array, a third array, a fourth array and a fifth array; the first array, the second array, the third array, the fourth array and the fifth array are arranged in sequence along the longitudinal direction; in response to that an upper eyelid of a human eye is located in the first array, the human eye is in an open state; in response to that the upper eyelid is located in the fifth array, the human eye is in a closed state; in response to that the upper eyelid is located in the second array, the human eye is in a half-open state; and in response to that the upper eyelid is located in the third array or the fourth array, the human eye is in a squinting state.

2. The near-eye display device of claim 1, wherein the lens comprises an inner surface facing a user and an outer surface facing away from the user;
   the transparent electrode layer is provided on the inner surface of the lens;
   or the transparent electrode layer is provided on the outer surface of the lens;
   or the transparent electrode layer is provided between the inner surface of the lens and the outer surface of the lens.

3. The near-eye display device of claim 1, further comprising:
   a wearing detector;
   a driver; and
   a processor;
   wherein the wearing detector, the driver and the processor are all provided on the eyeglass frame, the processor is electrically connected to the wearing detector and the driver respectively, the driver is electrically connected to the transparent electrode layer, and the driver is configured to drive the transparent electrode layer to detect the capacitance.

4. An eye command recognition method, applied to the near-eye display device of claim 1, comprising:
   controlling a transparent electrode layer of the near-eye display device to obtain capacitance information at a position of human eyes;
   determining motion of the human eyes based on the capacitance information; and
   converting the determined motion of the human eyes into control commands for controlling the near-eye display device.

5. The eye command recognition method of claim 4, wherein the capacitance information comprises a capacitance value, and the capacitance detection of the transparent electrode layer is a self-capacitance detection;
   the determining motion of the human eyes based on the capacitance information comprises:
   comparing the capacitance value with a pre-stored standard capacitance value;
   determining that the human eye is in an eye-closed state, in response to that the capacitance value is greater than the standard capacitance value;
   comparing this comparison result with the previous comparison result;
   in response to that the comparison results are the same, continuing to perform the comparing the capacitance value with the prestored standard capacitance value; and
   in response to that the comparison results are different, determining that an eye-closed motion of the human eyes occurs.

6. The eye command recognition method of claim 5, wherein after the comparing the capacitance value with the pre-stored standard capacitance value, the method further comprises:

determining that the human eyes are in an eye-open state, in response to that the capacitance value is less than or equal to the standard capacitance value;

comparing this comparison result with the previous comparison result;

in response to that the comparison results are the same, continuing to perform the comparing the capacitance value with the pre-stored standard capacitance value; and in response to that the comparison results are different, determining that an eye-open motion of the human eyes occurs.

7. The eye command recognition method of claim 6, wherein the determining motion of the human eye based on the capacitance information further comprises:

in response to that an interval between the eye-closed motion and the eye-open motion is less than a first preset time, determining that the human eye is a blink motion.

8. The eye command recognition method of claim 4, wherein the capacitance information comprises a capacitance waveform that changes with time;

the determining the motion of the human eyes based on the capacitance information comprises:

comparing the capacitance waveform at a second preset time with pre-stored standard waveform data to generate a comparison result; and determining the motion of the human eyes based on the comparison result.

9. The eye command recognition method of claim 8, wherein the comparing the capacitance waveform at the second preset time with the pre-stored standard waveform data comprises:

extracting waveform feature points in the capacitance waveform during the second preset time; and comparing the waveform feature points with the pre-stored standard waveform data.

10. The eye command recognition method of claim 8, wherein the comparing the capacitance waveform at the second preset time with the pre-stored standard waveform data comprises:

intercepting the capacitance waveform during the second preset time to obtain a waveform segment; and comparing the waveform segment with the pre-stored standard waveform data.

11. The eye command recognition method of claim 4, wherein before the controlling the transparent electrode layer to obtain the capacitance information at the position of the human eyes, the method further comprises:

detecting whether the user wears the near-eye display device, and generating a detection command and transmitting the detection command to the transparent electrode layer in response to that the user wears the near-eye display device.

12. A non-transitory readable storage medium, wherein an eye command recognition program is stored on the readable storage medium, and steps of the eye command recognition method according to claim 4 are implemented when the eye command recognition program is executed by a processor.

* * * * *